United States Patent [19]
Francisco-Arnold

[11] 4,132,084
[45] Jan. 2, 1979

[54] SUBMARINE CONDUCTOR FOR THE DEEP SEA TRANSMISSION OF HIGH VOLTAGE ELECTRICAL POWER

[76] Inventor: Richard D. Francisco-Arnold, P. O. Box 452, Bronxville, N.Y. 10708

[21] Appl. No.: 736,737

[22] Filed: Oct. 29, 1976

Related U.S. Application Data

[63] Continuation-in-part of Ser. No. 605,933, Aug. 19, 1975, abandoned.

[51] Int. Cl.$^2$ ............................................. F16L 1/00
[52] U.S. Cl. ................................. 405/171; 174/24; 307/84; 340/4 R; 405/172
[58] Field of Search .................. 61/107, 112, 113, 114; 9/8; 114/5 F, 230; 174/24, 25 R, 101.5; 340/4 R, 5 R; 307/84

[56] References Cited
U.S. PATENT DOCUMENTS

| 2705 of | /1865 | GBX | |
|---|---|---|---|
| 1,711,879 | 5/1929 | Ehret | 340/4 R |
| 3,026,729 | 3/1962 | Johnson | 340/4 R X |
| 3,173,271 | 3/1965 | Wittgenstein | 61/112 |
| 3,845,233 | 10/1974 | Burton | 174/24 |
| 3,858,166 | 12/1974 | Hammond | 340/5 R |

FOREIGN PATENT DOCUMENTS 1260389 3/1961 France .................................. 174/101.5

*Primary Examiner*—Jacob Shapiro

[57] ABSTRACT

An improved thermally active submarine conductor for transmission of high voltage electrical power within bodies of water whose maximum depth and pressure is in excess of the maximum depth and pressure operative capacity of available conductive elements of the said conductor, as well as alternative means for the said transmission. The said conductor is comprised of a number of specifically adapted interdependent elements, each essential to the said transmission function, including: thermally active conduction and insulation elements, and sheathing and mechanical armorment elements as may be required for depth pressure and mechanical flexing protection, in addition to flotation elements, and tethering and anchoring stabilization elements, in order to maintain the said conductive elements at a functional depth and lateral routing, within a prescribed variance range radially circumscribing the said routing; and to prevent said elements from descending to a depth and pressure prohibitive to their proper function.

3 Claims, 8 Drawing Figures

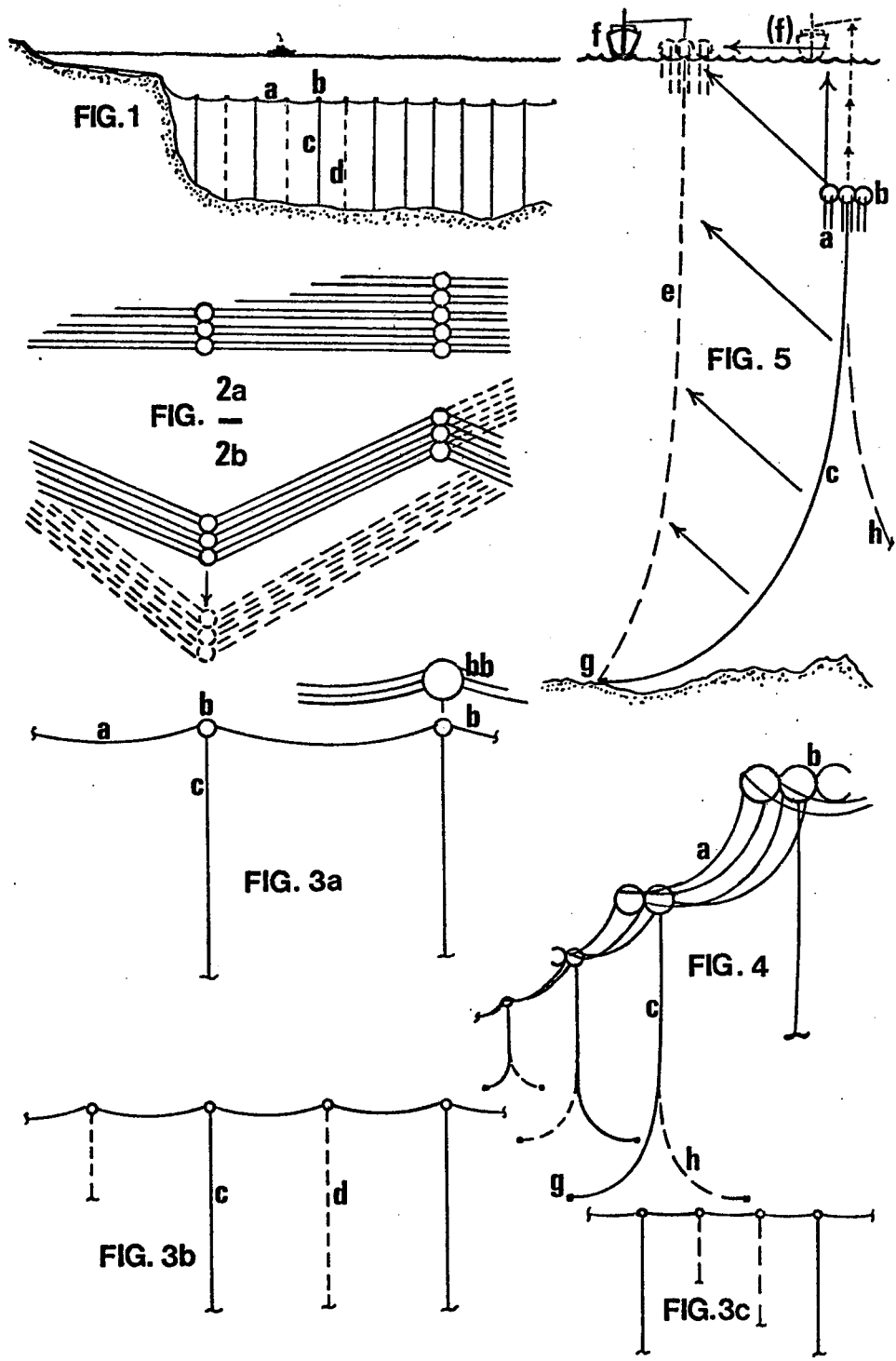

SUBMARINE CONDUCTOR FOR THE DEEP SEA TRANSMISSION OF HIGH VOLTAGE ELECTRICAL POWER

This application is a continuation-in-part of application Ser. No. 605,933, filed Aug. 19, 1975, now abandoned.

SUMMARY

In order to expand the present utilisation of high voltage submarine electrical power transmission, within bodies of water whose depths exceed approximately 1000 to 2000 meters; especially throughout the world's oceans, where depths often consistently exceed 4000 to 6000 meters, an improved high voltage conductor is herewith proposed. This said conductor is unlike the traditional cable used for this type of transmission (which are functional to maximum depths of 1000-2000 meters) in that it encompasses additionally vital functioning elements; including flotation means to allow the conductive means to remain always within functionally operative depths, and mooring and anchoring means to stabilise the various vital component means at the particular placement within the body of water wherein the conductor is deployed, within a radial variance range of the said placement.

It is intended that the said conductor should be free to vary within a given deployment routing according to current conditions, depth-density variance factors, etc. Naturally, deployment would be achieved at a sufficiently safe depth below the surface in order to avoid sea creatures, submarine vessels; and in addition, where surface waters of constantly fluctuating physical condition due to ambient influences begin to grow sufficiently stable so as to more readily anticipate operative conditions on a perminent basis; this being in the approximate range of 300 meters to the maximum deployable depths feasible.

The number and placement of the flotation means secured adjacent to the armorment means would depend upon the degree of constant buoyancy deemed to be essential. This could be varied to permit intermittent, segmented said means, with the conduction, insulation and armoring means being suspended in catanary fashion between the flotation elements; or consistently interlinked for unbroken support. Much would depend upon the free movement desired for the conductor, as well as internal oil flow factors or other insulator materials used within the conduction and/or insulation elements. The mooring elements would be attached most likely to the flotation elements in numbers and lengths as deemed essential for stability and free movement function.

It is a principal object of this invention to offer an improved thermally active conductor for the transmission of high voltage electrical power within depths presently prohibitive to existing means for this type of transmission.

It is another object of this invention to put forth a conductor which encompasses a number of functionally vital elements in combination, some of which may be variable in extent of utilisation according to specific application.

It is a final object of this invention to expand the useful service of high voltage electrical power within any body of water throughout the world, without regard to sea depths and bottom contours. Further in this regard, through utilisation of high voltage, as well as ultra high voltage and Direct Current circuitry, transocean interconnections for interconnection of power systems can be established. Moreover, ocean born generation systems might be interconnected within this device for transference of power bi-directionally within such potential interconnections.

DRAWINGS

FIG. 1 is an elevation of the conductor as installed from a distance beneath the surface in deep water, with (a) the conductor, insulator and armorment elements, and (b) the flotation elements, and (c) the tethering-/mooring elements. (d) is an illustration variable use of (c) according to requirements.

FIGS. 2a & 2b are various plan views of deployment schemes. 2b is transversed pattern for additional free movement, as well as surfacing slack on a perdendicular planar method format.

FIGS. 3a,3b & 3c are variations of elements (b) and (c) in number within a given amount or length of element (a), according to requirements; with (bb) a size variation of element (b).

FIG. 4 is a one point perspective view of the conductor in full deployment from a point on the sea floor; with (g) being the anchoring element, and (h) being additional tethering elements.

FIG. 5 is a frontal elevation, with (e) being elongated tether element (c) during surfacing of device from vessel (f). (c) and (h) further indicate in-place scoped multiple tethering.

In order to achieve functional capability, the improved conductor elements must be secured in a combination so as to permit the combined elements of conduction, insulation, armorment, flotation and tethering to achieve apx. specific gravity at the prescribed lateral route and depth of chosen deployment, with sufficient capability for the said means to freely vary within a prescribed variance range radially circumscribing the said routing when the tethering/mooring and anchoring elements are fully deployed in their proper configuration.

Additionally, a plurality of any or all of the said elements may be subsequently added for increased capacity. And weighting elements might be employed to equalize overbuoyancy.

The conductor would comprise a central conduction core of copper or aluminum, and would contain oil based fluid or gaseous transfer substances impregnated and/or pressurised in most instances; to provide improved efficiency and thermal discharge ability. Surrounding the conduction element is an impregnated paper or a synthetic polymer insulation; the latter being likely in future years as insulation technology for high voltage transmission progresses. Interfacing both conduction and insulation element would be numerous paper, carbon and lead tapes of varying tapes as required for further insulation. And finally the outer, exposed element of armoring for depth-pressure, mechanical stress and protection as required; and structured so as to accommodate required flotation elements, either (A) continuous, or (B) intermittent/segmented deployment depending upon the support configuration deemed proper; especially in order to best maintain proper radial catenary of the combined conduction elements, and particularly the insulation and any internal fluid equilibrium and/or flow. Also, flotation elements might be constructed in modular interconnectable format.

The configuration of the flotation elements would be such as to withstand the depth-pressures of chosen deployment depth, as well as hydrodynamically maintain stable positioning of the device. This configuration is believed best suited to spherical-thru-cylindrical, depending upon application, with minimal tangential contact-for heat dispersion-to conduction elements.

In order to achieve subsurface stabilised buoyancy for a given quantity and weight of conduction, insulation and any armorment elements, where intermittent, segmented flotation elements are employed, the size of the said flotation elements would have to vary according to their intermittent use from one another. This factor is further influenced by the number, length and weight of the multiple tethering elements as are employed in combination. The length of the tethers would be determined by depth, as well as line scope factor deemed suitable for a given deployment. The weight would depend upon the type of material used. This most likely would be a polymer synthetic material such as Nylon, Polyester or Kevlar, likely constructed in braided fashion for maximum strength. The flotation elements would likely also be a polymer substance such as syntactic foam for low weight, high strength and long life capacity within deep ocean environmental conditions.

In order to achieve sectional surfacing of the conductor it might be either deployed on a transversed lateral plane and sectionally raised from the surface on a perpendicular axis. Additionally, wherein a considerable degree of catanary slack is introduced in the conduction, insulation and armorment elements between segmented flotation elements, the conductor may be surfaced sectionally via elongation of the slack. Also, the servicing may occur in place using proper submersibles.

With respect to ancillary equipment, elements for securing the principal said elements into a functional entity would naturally be employed where required, as well as means for preserving the proper radial configuration of the conduction, insulation and armoring elements at the point of interconnection with the flotation elements in certain instances; especially in deeply catanaried deployment situations.

Other means might include electronic sonar signaling devices for subsurface craft warning, as well as surface location access. Also warning devices for excessive depth-pressure operative conditions, as well as automatic shutdown in the event of such conditions should present a hazard to functioning. This might consist of small sensors (affixed to transmission or flotation elements), and a parallel feed circuit therealong.

Regarding the method of deployment, a series of slave buoyant means might be temporarily employed for gradual descent from the surface to the depth of desired deployment the deployment vessel moves forward over the chosen route. These means would be strung on successively lengthened tethers astern of the said vessel and cyclically removed and brought forward as the transmission device reaches its proper depth. Another potential ancillary means is a tensional flexible member extending between flotation elements in instances where excessive tension upon the conduction, insulation and armorment elements might arise when flotation elements are widely spaced in aforesaid segmented configuration. However, it is unlikely this would be required except under the most severe types of operatonal conditions, or extreme catanaried deployments.

Where a plurality of parallel conduction, insulation and armorment elements are employed (for capacity and electrical circuitry), flotation elements might be either utilised in singular or multiple grouping (in the former instance being of a larger size with multiple conduction, insulation and armorment attachment, or in the latter instance interconnected via proper means to one another). The tethering/mooring in such latter instance being attached to one or more said flotation elements as required; according to the number of individual said tether elements deployed at a central apex zone, as well as hydrodynamic stability requirements of a grouped plurality of said flotation elements. Also, tethers may be secured directly to said armorment.

It should be stressed that many variations in the configuration of this said conductor are possible according to the particular circumstances of deployment. However, at all times all said principal elements are vitally interdependent to continued function of the said conductor in the said bodies of water.

The type of conduction and insulation elements generally referred to herein are the oil impregnated high voltage type developed in 1917, but include also synthetic dialectric type under development, and of any high or ultra high voltage capacity. Though not likely practical, it might through development be possible to incorporate the flotation means within the armorment structure; though heat dissipation problems would likely ensue. The conductive elements specifically referred hereto are of depth-pressure sensitive type (with definite maximum depth deployment limitations, and being substantially less than majority intended deep ocean application as suggested herein), as well as being of the 'thermally variable' single core high voltage self-contained type for submarine use, specifically designed for suspended function (and in most cases individually according to each application). Additionally, the said armorment elements, in addition to being applicable to the latter, are designed for integrated use with a required number and configuration of flotation elements (in either said modular interconnectable or independent design format), either in adjacent/tangential (leaving as much of the self-contained transmission elements exposed to the ambient sea for heat cycling and resultant heat dissipation capability; and as distinct from non-thermally active low voltage wires wherein used under similar circumstances), or attached via an intermediate or stringer-type (possibly space frame) interconnection member. Further vis-a-vis armorment elements, it is possible that technological development in synthetic polymer insulation materials may allow for utilisation of unarmored conductive elements; notwithstanding consideration to the potentially required depths of deployment safety. It is not, however, at the time of this writing deemed feasible to employ unarmored conductive means -particularly of the cellulose type- at the depths herein considered; for either cellulose or synthetic polymer (this must be assumed in the latter case as the higher voltages have not been attained with synthetic insulation materials).

Further with respect to the types of conductor and insulation, the aforesaid Gas Filled (dev. 1955-1965) type is likely to be used for transoceanic-in view of distance-installations; in addition to pressurized or non-pressurized synthetic polymer-at least in part-insulated types, as ongoing capacity developments warrent; including extrusions.

With respect to the type of anchoring elements, it is likely that power propelled impact embedding (aka as DWA or 100K) type would be used; particularly in deep application.

Regarding the hydrodynamic stability of the various elements in operative combination, it is likely that should weighting compensation means be incorporated-as required for specific gravitational stability in a particular instance-in a cooperative format with the flotation support elements they would likely be placed on the lower portion of the element for upright stability. It might be useful to either structurally add underside weighting or secondarily apply the same on supports wherein no tetherings are utilised, since this would tend to compensate for any lessening of stability in such instance. Also flotation elements may be integral modules.

The scoped tethering(s) might also incorporate a length of chain or weighted mechanical tethering at the lower extremity of the line and above the anchoring element. This might help to set the scope in proper configuration. However, deployment computer analysis would likely dictate all aspects of the tethering Array geometry and compositional elements for a given deployment.

It also should be clarified that specific gravity deployment (or stabilised or neutral buoyancy as referred to) refers to all elements in operative combination, and within and radial variance (i.e., positive-negative buoyancy) range according to ambient conditions, and perhaps particular requirements.

In the matter of the said tethering line; this would be a prestretched fiber installation in most instance (as the intended synthetic braid offers substantial elasticity; which would result in greater economy vis-a-vis quantity utilised when fully stretched, as well as firmly anticipate its function).

Finally, on an overall basis with respect to operative characteristics, when fully deployed the combined slack provided by scoped tetherings, and catanaried conductive elements allow for a fully free-floting entity (and as regards each buoyant element independantly according to ambient sea conditions); and additionally lend substantial elongation flexibility for surfacing all or a portion of the said entity should same be required during any subsequent period.

An important consideration may be the inclusion of Antisubmarine Warfare (ASW) and/or various types of oceanographic sensor gear fitted throughout the installation. Such equipment would include ASW hydrophones of various frequency; and various types of additional sensor equipment, such as: current flow indicators, density (salinity/temperature/depth) instrumentation, seismic indicators, sonar and mooring tension indicators, stabilisation detectors and data tape retrieval systems, etc.

As previously stated, it logically holds that high voltage submarine installations, extending from various shore points or more specifically utility grid points, are possible irrespective of the depths transversed. Of course, in such instance it is likely that various depths would be encountered. Thus, in shallow areas-within the operative capacity thereof-conductive elements might extend independantly in any alternate format and rest on the bottom thus constituting an integral, elementally extensive conductor installation. Additionally, any point of the installation might be surfaced to accommodate various interconnected floting entities, such as high voltage generating systems (such as thermal gradient, wind, nuclear, etc.), or interline switch terminals and/or system interconnection points.

A final structural alternative would entail the use a central interconnection member wherein all, or at least the principal elements of the functional whole would be adaptable thereto (including buoying and/or weighting elements, conductive elements and tethering/mooring lines). The configuration of this modular interconnection member may be of space frame or solid type with receiving appartures on its surface. It might be so constructed so as to accept multiple buoyant means in modular format as specific installation requirements dictate, and one or more tethering lines at its underside or lower extremety. The said tetherings might be affixed to a universal type joint for freedom of movement in relation to the conductive elements secured thereto.

I claim:

1. An improved thermally active submarine conductor for the transmission of high voltage electrical power within a body of water the maximum depth of which exceeds the maximum depth operative capacity of practically viable available conductors for the said transmission; and which comprises a number of elements comprising at least a single semi-flexible thermally active linear high voltage conductor element; a number of elements comprising at least a single semi-flexible thermally active high voltage insulation element completely disposed about the said conductor element; a number of elements comprising at least a single semi-flexible sheathing and mechanical armoring element as required completely disposed about the aforesaid elements; a number of buoyant compensation elements disposed proximately about the aforesaid elements in number, size and buoyant capacity so as to maintain at approximately specific gravity, when further comprising therealong a number of tethering/mooring and anchoring stabilisation elements sufficient to provide at least a partially scoped non-tensioned deployment geometry for a prescribed degree of controlled free-flotation of the aforesaid elements; as well as a required number of elements for interconnecting all of the aforesaid elements into a complete functional entity, following a specified submarine routing suspended within the said body of water at a depth or linear plurality thereof following therealong, within a prescribed variance range circumscribing the said routing according to ambient sea conditions and said tethering/mooring prescribed geometry.

2. A method of interconnecting at least two high voltage electrical utility systems which are intersected by a body of water the maximum depth of at least some intervening portion of which exceeds the maximum depth operative capacity of practically viable available conductive means for the said installation, and which comprises: installing a number of elements comprising at least a single semi-flexible thermally active high voltage submarine conductor element completely disposed within a number of elements comprising at least a single semi-flexible thermally active high voltage insulation element, as well as a number of elements comprising at least a single semi-flexible sheathing and mechanical armoring element as may be required completely diposed about the aforesaid elements, and which follow a specified routing between the said systems, and which further comprises a number of buoyant compensation elements disposed proximately about the aforesaid elements in at least those excessive depth portions of the installation in number, size and buoyant capacity so as to maintain at approximately specific gravity, when further comprising a number of tethering/mooring elements disposed therealong in at least partially scoped non-tensioned geometry so as to provide a prescribed degree of controlled free-flotation of the aforesaid elements when anchored to the sea floor, following the said routing and suspended within the said body of water at a depth or linear plurality thereof following therealong, within the operative capacity of the said elements, and within a prescribed variance range circumscribing the said routing within the said excessive depth portions according to ambient sea conditions and said tethering/mooring prescribed geometry.

3. An installation for interconnecting at least two high voltage electrical utility systems which are intersected by a body of water the maximum depth of at least some intervening portion of which exceeds the maximum depth operative capacity of practically viable available conductive means for the said installation, and which comprises: installing a number of elements comprising at least a single semi-flexible thermally active high voltage submarine conductor element completely disposed within a number of elements comprising at least a single semi-flexible thermally active high voltage insulation element, as well as a number of elements comprising at least a single semi-flexible sheathing and mechanical armoring element as may be required completely disposed about the aforesaid elements, and which follow a specified routing between the said systems, and which further comprises a number of buoyant compensation elements disposed proximately about the aforesaid elements in at least those excessive depth portions of the installation in number, size and buoyant capacity so as to maintain at approximately specific gravity, when further comprising a number of tethering/mooring elements disposed therealong in at least partially scoped non-tensioned geometry so as to provide a prescribed degree of controlled free-flotation of the aforesaid elements when anchored to the sea floor, following the said routing and suspended within the said body of water at a depth or linear plurality thereof following therealong, within the operative capacity of the said elements, and within a prescribed variance range circumscribing the said routing within the said excessive depth portions according to ambient sea conditions and said tethering/mooring prescribed geometry.

* * * * *